US012675889B2

(12) United States Patent
Sekkappan et al.

(10) Patent No.: US 12,675,889 B2
(45) Date of Patent: Jul. 7, 2026

(54) ESTIMATING FLOW VECTORS FOR OCCLUDED CONTENT IN VIDEO SEQUENCES

(71) Applicant: Nvidia Corporation, Santa Clara, CA (US)

(72) Inventors: Karthick Sekkappan, Pune (IN); Aurobinda Maharana, Chinchwad (IN); Vipul Parashar, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 449 days.

(21) Appl. No.: 17/957,423

(22) Filed: Sep. 30, 2022

(65) Prior Publication Data

US 2024/0112356 A1    Apr. 4, 2024

(51) Int. Cl.
| | |
|---|---|
| *G06T 7/269* | (2017.01) |
| *G06V 10/25* | (2022.01) |
| *G06V 10/26* | (2022.01) |
| *H04N 19/132* | (2014.01) |
| *H04N 19/139* | (2014.01) |
| *H04N 19/513* | (2014.01) |

(52) U.S. Cl.
CPC .............. *G06T 7/269* (2017.01); *G06V 10/25* (2022.01); *G06V 10/26* (2022.01); *H04N 19/132* (2014.11); *H04N 19/139* (2014.11); *H04N 19/513* (2014.11)

(58) Field of Classification Search
CPC . G06T 7/215; G06T 7/11; G06T 2207/10016; G06T 7/20; H04N 19/51; H04N 19/139; H04N 19/527
See application file for complete search history.

(56) References Cited

U.S. PATENT DOCUMENTS

| | | | | |
|---|---|---|---|---|
| 2005/0105764 A1* | 5/2005 | Han | ........................ | G06V 10/24 340/5.1 |
| 2006/0268982 A1* | 11/2006 | Lee | ........................ | H04N 19/147 375/E7.265 |
| 2007/0064977 A1* | 3/2007 | Nagata | .................... | H04N 23/68 386/E5.072 |
| 2007/0110159 A1* | 5/2007 | Wang | .................... | H04N 19/176 375/E7.176 |
| 2010/0231593 A1* | 9/2010 | Zhou | ..................... | G06T 3/4007 345/428 |

(Continued)

OTHER PUBLICATIONS

Final Office Action issued in U.S. Appl. No. 17/968,260, dated Nov. 26, 2025.

(Continued)

*Primary Examiner* — Daniel Chang
(74) *Attorney, Agent, or Firm* — Hogan Lovells US LLP

(57) ABSTRACT

Systems and methods estimate optical flow vectors for occluded pixels between frames of a video sequence. Regions of occluded pixels may be identified and a cause of their occlusion may be determined. Different estimation techniques may be applied based, at least in part, on the cause of occlusion to provide a lightweight, less resource intensive estimation of optical flow data. Optical flow vectors for pixels that are occluded due to movement out of a frame may be estimated using a first technique while optical flow vectors for pixels that are occluded due to foreground movement may be estimated using a second technique.

17 Claims, 13 Drawing Sheets

600

602 — Receive optical flow data for two or more temporally spaced frames of a video sequence 604 — Determine, based at least in part on the optical flow data, a set of occluded pixels corresponding to pixels that move out of a frame boundary between a first frame and a second frame 606 — Determine, for each occluded pixel of the set of occluded pixels, a reverse direction flow vector 608 — Estimate a respective optical flow vector for each occluded pixel of the set of occluded pixels as a negative value of a respective reverse direction flow vector

(56) References Cited

U.S. PATENT DOCUMENTS

| | | | |
|---|---|---|---|
| 2010/0302451 A1* | 12/2010 | Ishikawa | H04N 7/014 348/E5.062 |
| 2011/0025825 A1* | 2/2011 | McNamer | H04N 13/221 348/46 |
| 2012/0033130 A1* | 2/2012 | Piek | H04N 19/40 348/E7.003 |
| 2017/0064204 A1* | 3/2017 | Sapiro | G06T 5/20 |
| 2017/0180729 A1* | 6/2017 | Wu | H04N 19/503 |
| 2017/0188046 A1* | 6/2017 | Wu | H04N 19/527 |
| 2017/0214937 A1* | 7/2017 | Lin | H04N 19/577 |
| 2018/0164887 A1* | 6/2018 | Wu | G06T 7/246 |
| 2018/0315174 A1* | 11/2018 | Staranowicz | G06T 5/70 |
| 2019/0138889 A1 | 5/2019 | Jiang et al. | |
| 2019/0295262 A1* | 9/2019 | Nagori | G06T 7/70 |
| 2020/0211204 A1* | 7/2020 | Shishido | G06T 7/223 |
| 2021/0042915 A1* | 2/2021 | Bernat | G06N 3/08 |
| 2022/0156946 A1* | 5/2022 | Lin | G06T 7/248 |
| 2022/0270267 A1* | 8/2022 | Ye | H04N 7/014 |
| 2022/0392089 A1 | 12/2022 | Guizilini et al. | |
| 2023/0169674 A1* | 6/2023 | Sakurai | G06V 10/764 382/103 |
| 2024/0112356 A1* | 4/2024 | Sekkappan | G06V 10/25 |
| 2024/0214565 A1 | 6/2024 | Liu et al. | |

OTHER PUBLICATIONS

Non-Final Office Action issued in U.S. Appl. No. 17/968,260, dated Jun. 16, 2025.

* cited by examiner

100

INPUT
102

PROCESSING PIPELINE
104

CONTENT PRESENTATION
116

OF ESTIMATION
112

FILLING
114

OPTICAL FLOW
108

OCCLUSION DET.
110

OCCLUSION FILLING PIPELINE 106

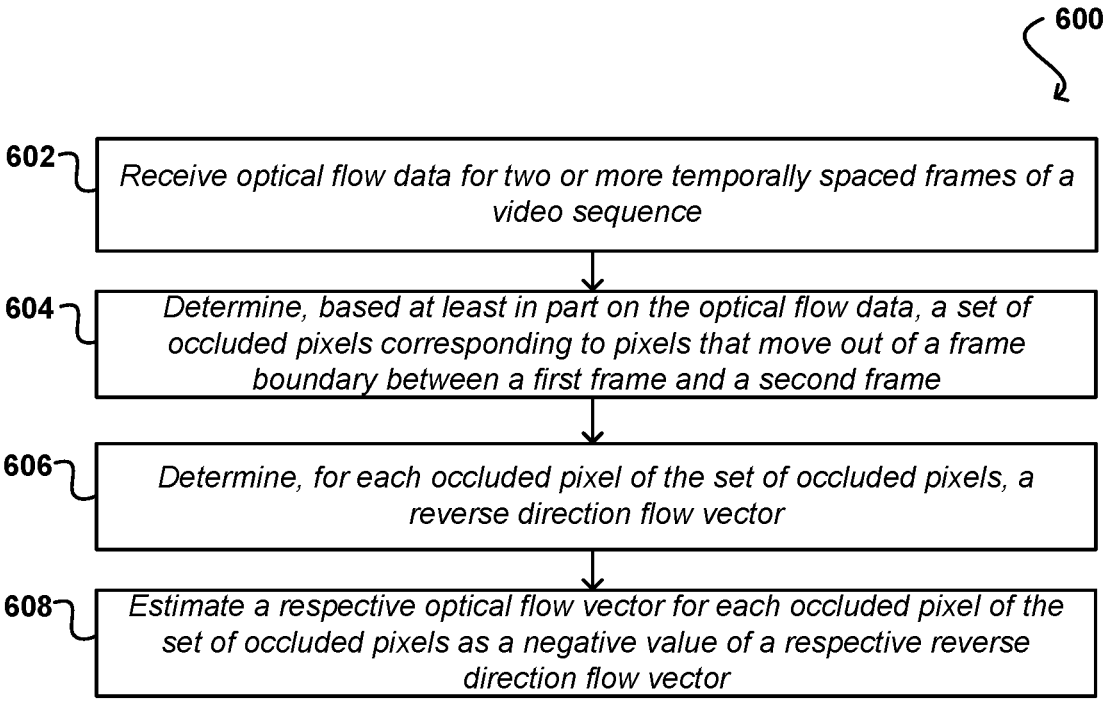

602 — Receive optical flow data for two or more temporally spaced frames of a video sequence 604 — Determine, based at least in part on the optical flow data, a set of occluded pixels corresponding to pixels that move out of a frame boundary between a first frame and a second frame 606 — Determine, for each occluded pixel of the set of occluded pixels, a reverse direction flow vector 608 — Estimate a respective optical flow vector for each occluded pixel of the set of occluded pixels as a negative value of a respective reverse direction flow vector

FIG. 6A

DATA CENTER
700

APPLICATION LAYER 740

APPLICATION(s) 742

SOFTWARE LAYER 730

SOFTWARE 732

FRAMEWORK LAYER 720

JOB SCHEDULER 722

CONFIGURATION MANAGER 724

DISTRIBUTED FILE SYSTEM 728

RESOURCE MANAGER 726

DATA CENTER INFRASTRUCTURE LAYER 710

RESOURCE ORCHESTRATOR 712

GROUPED COMPUTING RESOURCES 714

NODE C.R.
716(1)

NODE C.R.
716(2)

NODE C.R.
716(N)

ESTIMATING FLOW VECTORS FOR OCCLUDED CONTENT IN VIDEO SEQUENCES

BACKGROUND

Video sequences may include various foreground and/or background objects that move around throughout the video sequence. In some instances, movement of the foreground and/or background objects can lead to occlusions of pixels between frames in the video sequences. As a result, certain pixels between different frames may be determined as having invalid flow vectors because one or more features can no longer be detected due to these movements. Without valid flow vectors, certain interpolation algorithms may be less capable of generating intermediate frames without artifacts. Previous solutions to address these occluded pixel segments are often slow and costly with respect to memory and processing requirements, making them less suitable for a variety of applications that require either real or near-real time processing and/or that execute on devices with limited compute and/or memory capabilities.

BRIEF DESCRIPTION OF THE DRAWINGS

Various embodiments in accordance with the present disclosure will be described with reference to the drawings, in which:

FIG. 6A illustrates an example flow chart of a process for estimating optical flow vectors for occluded pixels due to movement out of a frame, according to at least one embodiment;

DETAILED DESCRIPTION

Approaches in accordance with various embodiments overcome these and other deficiencies by providing a lightweight, fast, real time or near-real time (e.g., without significant delay) method to detect and estimate optical flow vectors for occluded pixels. In at least one embodiment, optical flow data is used to determine occluded regions between images in a sequence. The optical flow data may be used to generate an estimate corresponding to an occluded region within a given frame. Additionally, various embodiments may use that estimate to fill those regions with estimated flow vectors. For example, for a set of occluded pixels, the occluded pixels may be evaluated to determine whether they have moved out of a frame of the image (e.g., beyond a boundary). If so, the optical flow for a given pixel may be estimated as a reverse of a known flow. That is, if forward flow is unknown, but backward flow is known, for a pixel moving out of a frame, the forward flow may be estimated as a reverse of the backward flow. Such an approach may be used to fill large areas of the occluded region, thereby leaving a smaller number of pixels for further processing. In at least one embodiment, the remaining pixels may be evaluated to estimate respective optical flows by in-filling pixels based on boundary pixels of the occluded pixels and a global flow. In this manner, optical flow vectors for each pixel within a frame may be estimated. This optical flow data may then be used by a variety of applications, such as for rendering intermediate frames in a sequence, motion detection, navigation, or a variety of other applications that may use detected motion in video.

Various embodiments of the present disclosure are directed toward estimating optical flow vectors for pixels that are not visible in a subsequent frame in a sequence of frames due to occlusion. One or more optical flow engines provide invalid flow vectors for pixels that are not visible in the next frame. These flow vectors are needed in order to generate an accurate intermediate (e.g., interpolated) frame. Embodiments provide systems and methods to generate approximate flow vectors for such pixels using an inexpensive technique. Various embodiments may determine an occluded area and separate this area into two or more categories, where different categories may be filled using different algorithms and/or different operations. For example, for occlusion due to pixels moving out of a frame, reversing an opposite flow vector (e.g., a backward flow vector for forward occlusion or a forward flow vector for backward occlusion) may be used to approximate flow vectors for certain pixels. Additionally, in an embodiment, for occlusion due to foreground object motion, flow vectors may be obtained from a boundary that closely matches a global flow. Accordingly, systems and methods overcome problems with existing techniques.

Figure 1:
FIG. 1 illustrates an example of an environment for video segment processing, according to at least one embodiment.

FIG. 1 illustrates an example environment 100 that can be used to provide such functionality in accordance with at least one embodiment. In this example, the environment may be associated with one or more video processing systems, such as a game engine, a motion detection system, a navigation system, or the like. As shown, an input 102 is provided to a rendering pipeline 104. The input 102 may include image data, such as a video sequence, that includes a series of frames of image data. The input 102 may be provided from an optical capture device, such as a camera, where the input 102 may be a live video feed, a stored video file, or some combination thereof. The input may also be part of gameplay footage, such as footage produced by a graphics processor by executing a video game. Additionally, the input 102 may be images received from a game engine for rendering on a display, which may be responsive to one or more inputs to one or more input devices by a user.

In this example, a processing pipeline 104 may include one or more algorithms or modules that execute to generate an output, which may be in the form of a video or single image, among other options. Additionally, the processing pipeline 104 may output data, for example, in embodiments where the pipeline 104 is a motion tracking pipeline to detect movement of an object. It should be appreciated that the processing pipeline 104 may be part of, or form a portion of, a software framework that includes components such as a rendering engine, a physics engine, sound engines, and/or the like. Moreover, it should be appreciated that the processing pipeline 104 of FIG. 1 is not limited to environments such as video generating, for example with video games, but may also be associated with a camera unit, such as on a personal device, where the processing pipeline may include components for receiving an input video or image stream, adjusting one or more factors (e.g., filtering, up-sampling, etc.), and then providing an output for display on a screen. Additionally, in embodiments, the processing pipeline 104 may form parts of an object detection system, for example for an autonomous vehicle, to detect objects, estimate their motion, and then, using that motion information, make one or more decisions regarding a trajectory or movement of the vehicle.

Various embodiments of the present disclosure are directed toward an occlusion filling pipeline 106 that may receive, as an input, a video sequence including at least two temporally spaced frames. While the inputs to the occlusion filling pipeline 106 are shown as coming from the processing pipeline 104, it should be appreciated that the input 102 may be provided directly to the occlusion filling pipeline 106 without going through the processing pipeline 104. The occlusion filling pipeline 106 may determine an optical flow between the frames, determine an occluded region between an input and a reference, estimate optical flow data for the occluded region, and provide output data back to the processing pipeline 104 associated with the optical flow data for the frames. This information may then be used by the processing pipeline 104 in order to improve an output set of frames, detect objects within a frame, add additional frames, and/or the like.

The illustrated occlusion filling pipeline 106 includes an optical flow engine 108, which may include one or more algorithms for determining optical flow between a pair of images, or in various embodiments, a larger sequence of images. The optical flow engine 108 may be used to determine one or both of a forward optical flow or a backward optical flow. A forward optical flow corresponds to movement between a first frame and a second frame where the first frame is at a first time to and a second frame is at a second time $t_1$. A backward optical flow corresponds to movement between a second frame and a first frame, where the first frame is at a first time to and a second frame is at a second time $t_1$. It should be appreciated that a variety of algorithms may be used to determine the optical flow, including but not limited the NVIDIA Optical Flow SKD from NVIDIA Corporation.

In at least one embodiment, an occlusion detection module 110 is used to determine one or more regions of the input 102 corresponding to an occluded region. As noted, an occluded region may be defined, at least in part, as a region where at least one of a forward optical flow vector or a backward optical flow vector is invalid. For example, the occluded region may correspond to a region of pixels that is not visible in one of a first image or a second image due to movement, such as panning and/or zooming or movement of an object within the image. It should be appreciated that this estimate may be visualized, for example as a gradient overlaid over the original image where the gradient is illustrative of a flow direction and/or intensity, but the estimated occlusion information corresponds to one or more pixels within a frame and their associated optical flow vectors, which may be invalid. In at least one embodiment, the occlusion detection module 110 may then be used to identify these particular pixels. These pixels may also be separated or segmented according to their optical flow data. For example, the pixels may be grouped between pixels that are occluded due to moving out of a frame and pixels that are occluded due to foreground object motion. As described herein, these different groupings of pixels may be estimated and filled differently. It should be appreciated that occlusion may also occur for additional reasons, such as noise, but embodiments may refer to occlusion due to movement out of a frame boundary or due to object movement for clarity and simplicity.

Various embodiments of the present disclosure further include the optical flow estimation module 112. The optical flow estimation module 112 may include one or more algorithms for determining optical flow information for a given occluded pixel, where the algorithm being used may be selected, at least in part, on a grouping or a parameter of the pixel. For example, as noted herein, a first algorithm may be used to estimate pixel flow vectors associated with movement outside of a frame while a second algorithm may be used to estimate pixel flow vectors associated with foreground object movement. By separating and using different algorithms, embodiments may be able to decrease a number of pixels for evaluation by more expensive, processing intensive algorithms. Additionally, algorithms may be tuned for particular circumstances, thereby providing improved results with reduced resource use.

Optical flow estimation may include determining an optical flow vector for a given pixel within a frame and/or pixels in two or more frames. These estimations may then be used by a filling module 114 to predict optical flow vectors for each pixel. As noted above, while the filling may be visualized, the output corresponds to individual flow vectors for each pixel. These flow vectors may then be provided to the processing pipeline 104 for further evaluation and use. For example, in an example with video processing, additional frames may be estimated to increase a frame rate, generate a slow motion effect, and/or the like. The information may then be provided to a content presenter 116, for example, in embodiments where optical flow is used for content generation. It should be appreciated that various other embodiments, such as those described herein, may not use the content presenter 116.

Various embodiments may use one or more processing pipelines in order to estimate an optical flow vector for one or more occluded pixels within a video segment. As noted above, different pixels may be handled and processed differently based, at least in part, on a reason for occlusion. Accordingly, various embodiments may include a multi-operation process to first determine an occluded area of a frame, determine a reason for the occlusion, process a first set of pixels, process a second set of pixels, and then fill in the pixels with estimated optical flow data. Embodiments may include estimating techniques for different types of motion. For example, for occlusion due to camera panning, reversing a backward direction flow vector to a forward direction (or vice-versa) may provide a lightweight method to estimate optical flow for regions of an image. For occlusion due to foreground/background object motion, embodiments may reverse a backward direction flow vector in a forward direction if a reverse of the backward direction flow vector is a close approximation to global flow. In various embodiments, only pixels that remain after the initial estimates are filled using expensive in-painting techniques, unlike existing techniques. For example, current approaches implement the same in-filling techniques regardless of occlusion status. Additionally, methods such as RANSAC (random sampling consensus) are used to estimate the model for each segment. In contrast, embodiments of the present disclosure may use scanline in-filling. Furthermore, prior methods use model propagation to refine the flow, while embodiments of the present disclosure may use median filtering to refine the flow.

Figure 2A:
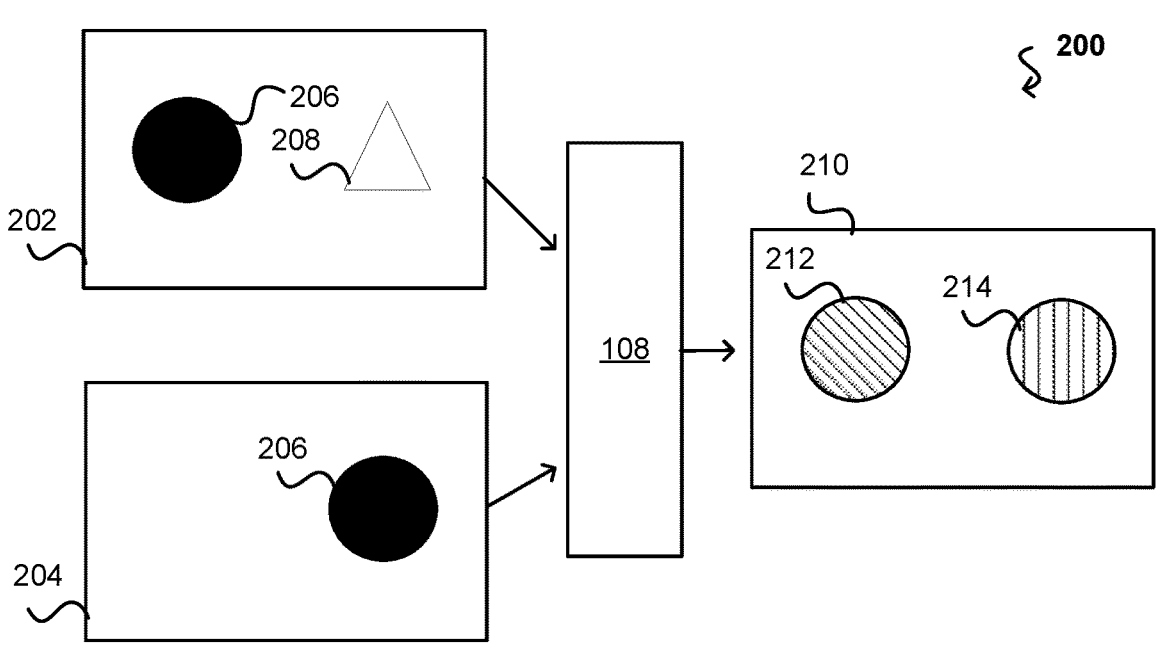
FIGS. 2A and 2B illustrate example representations of occlusion due to movement of a foreground object, according to at least one embodiment.
Figure 2B:
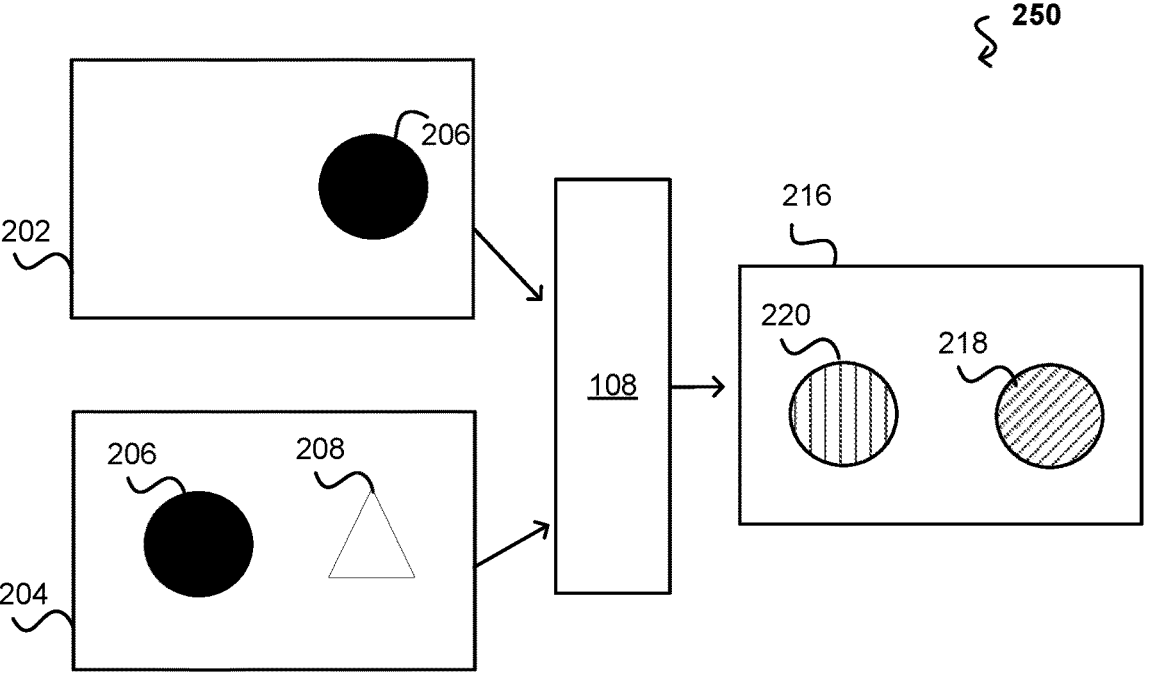

FIGS. 2A and 2B illustrate representations 200, 250 of an optical flow determination between a forward optical flow in the representation 200 and a backward optical flow in the representation 250. In the examples, frames 202, 204 are presented for evaluation by the optical flow engine 108. The frames 202, 204 may be part of a video sequence and may be temporally spaced frames, such that the frame 202 is at a first time and the frame 204 is at a second time, which in this example is later than the first time. In various embodiments, frame 202 may be referred to as "Frame A" and frame 204 may be referred to as "Frame B." In this example, a first object 206 is shown in both frames 202, 204. The first object 206 is positioned at a pixel location (x, y) in the frame 202, which may be denoted as $A_1(x, y)$. A second object 208 is shown in the first frame 202 of FIG. 2A and the second frame 204 of FIG. 2B. The second object 208 is positioned at a pixel location (x, y) in the frame 202 of FIG. 2A, where the location may be donated at $A_2(x, y)$.

Referring to FIG. 2A, the first object 206 moves from the pixel location $A_1(x, y)$ to the pixel location $A_1(x,y)$ between the first frame 202 and the second frame 204, thereby occluding the second object 208 in the second frame 204. The first object 206 is then shown positioned at the pixel location $B_1(x,y)$, which may correspond to $A_2(x, y)$, in certain embodiments. That is, the second object 208 is no longer visible in the second frame 204 due to the movement of the first object 206. This movement may be processed by the optical flow engine 108, which generates a representation 210 of these optical flows for the objects. It should be appreciated that the representation 210 is for illustrative purposes and for clarity and that, in various embodiments, the output corresponding to optical flow is a vector associated with the different pixel locations. In this example, an optical flow representation 212 indicates a flow vector $(F_a(x,y))$ from pixel $A_1(x, y)$ to an associated pixel in the second frame 204, $B_1(x, y)$. This may be referred to as a forward direction flow vector. The optical flow representation 212 is shown with different hatching from a second optical flow representation 214. The optical flow representation 212 is a valid flow vector that points to the right (e.g., indicates that the first object 206 has moved to the right between the first frame 202 and the second frame 204). The optical flow representation 214 is an invalid flow vector due occlusion caused by the movement of the first object 206.

Referring to FIG. 2B, the first object 206 moves from the pixel location $A_2(x, y)$ to the pixel location $A_1(x,y)$ between the first frame 202 and the second frame 204, thereby no longer occluding the second object 208. The first object 206, after the movement, is shown positioned at the pixel location $B_2(x, y)$, which may correspond to $A_1(x, y)$ in certain embodiments. Additionally, after the movement, the second object 208 is now visible at the pixel location $A_2(x, y)$, which may also be referred to as $B_1(x, y)$. This movement may be processed by the optical flow engine 108, which generates a representation 216 of these optical flows for the objects. It should be appreciated that the representation 216 is for illustrative purposes and for clarity and that, in various embodiments, the output is a vector associated with the different pixel locations. In this example, an optical flow representation 218 indicates a flow vector $(F_b(x,y))$ from pixel $A_2(x, y)$ to an associated pixel in the second frame 204, $B_2(x, y)$. This may be referred to as a backward direction flow vector. The optical flow representation 218 is shown with different hatching from a second optical flow representation 220. The optical flow representation 218 is a valid flow vector that points to the left (e.g., indicates that the first object 206 has moved to the left between the first frame 202 and the second frame 204). The optical flow representation 220 is an invalid flow vector due to occlusion caused by the movement of the first object 206.

As shown, the movement of the objects in FIGS. 2A and 2B generate occluded areas, which may not have a valid optical flow vector, and as a result, may not be used for a variety of applications without expensive analysis and in-painting. However, various embodiments of the present disclosure are directed toward estimating a flow vector located at the pixel locations (x, y) that get occluded in the second frame 204. This estimated flow vector may be referred to as $F_a^*(x,y)$. In an example, A(x, y) is a pixel that gets occluded in the next frame, and as a result, $F_a(x, y)$ will be unavailable and $F_b(x, y)$ will be available. Embodiments estimate $F_a(x, y)$ by providing occlusion information obtained from an occlusion detection algorithm into the optical field estimation 112 for further analysis, as indicated herein.

As noted, embodiments of the present disclosure may include different operations or analysis based, at least in part, on a reason or cause of pixel occlusion. For example, a first evaluation may be used for pixels that are occluded due to movement out of a frame, such as due to camera panning, zooming, etc. A second evaluation may be used for pixels that are occluded due to movement of foreground objects, such as the examples shown in FIGS. 2A and 2B. It should be appreciated that additional evaluations and/or operations may be used and there may also be further reasons why pixels are occluded—e.g., due to noise.

Regarding occlusion(s) due to a pixel going out of a boundary in a next frame, various embodiments may estimate optical flow based, at least in part, on an evaluation of optical flow in an opposite direction. For example, occlusion due to a pixel going out of boundary in a frame may be represented by:

$$\forall x \forall y (A(x,y) == \text{Occluded in next frame AND}$$

$$(x,y) + (-F_b(x,y)) == \text{out of frame bound}) \rightarrow (F_a(x,y) = -F_b(x,y))$$

where, as noted above, A may be a frame in a video sequence, B is a frame temporally next to A, A(x,y) indicates a pixel location (x,y) coordinate in A, $F_a(x,y)$ indicates a flow vector from pixel A(x,y) to a pixel in B (e.g., a forward direction flow vector), and $F_b(x,y)$ indicates a flow vector from a pixel B(x,y) to a pixel in A (e.g., a backward direction flow vector). Embodiments may also be represented as the following pseudo-code, which may form one or more portions of an algorithm for estimating optical flow data:

```
If (A(x,y) is a pixel that gets occluded in next frame)
{
    Let Fa*(x,y) = -Fb(x,y)   // -Fb(x,y) is reverse of backward flow
    vector at (x,y)
```

US 12,675,889 B2

7
-continued

```
If( Fa*(x,y) + (x,y) is out of frame bound)
{
    Fa(x,y) = −Fb(x,y)
}
}
```

Accordingly, various embodiments may, as at least a portion of the analysis, identify pixels having invalid flow vectors, determine whether the pixel is invalid due to movement out of frame, and then, if so, set an estimated flow vector for the pixel to its opposite (e.g., a negative value of the flow vector in the opposite direction). Such an estimation may be provided over large areas of the frame in certain embodiments, such as those where the frame pans or zooms, which may be assumed to have limited movement for the remaining objects. Moreover, even if the assumption for limited objects is not true, these pixels may be further evaluated to determine that they remain in frame, and as a result, further evaluation may be performed to identify and estimate other flow vectors.

As noted, various embodiments may segment or otherwise group different pixels into subsets including pixels that are occluded due to movement out of the frame, as noted above, and others that are occluded due to foreground object movement. For the second subset associated with foreground objection movement, further analysis may be performed to estimate flow vectors for the remaining occlusion segments. Embodiments may include operations such as identifying boundary pixels of occluded regions. These boundary pixels may be compared with a global flow, which may be closely related to the background object's flow, and boundary pixels closely related to the global flow may have a higher preference for inpainting. The boundary pixels with similarity to the global flow (e.g., similarities in magnitude and polar angle) may be identified as regions for in-painting. Identified points may be arranged within an analysis queue and then traversal in one or more (e.g., four) directions (e.g., left, right, up, and down) may begin at a starting point and continue to in-fill all holes during traversal. The method may continue until a boundary point is reached. As will be described, various embodiments may implement a fast scanline method on valid boundary pixels. Costmaps may be used, where an invalid pixel has an infinite cost, and an iterative process may proceed to in-fill affected pixels with a lowest cost.

Figure 3:
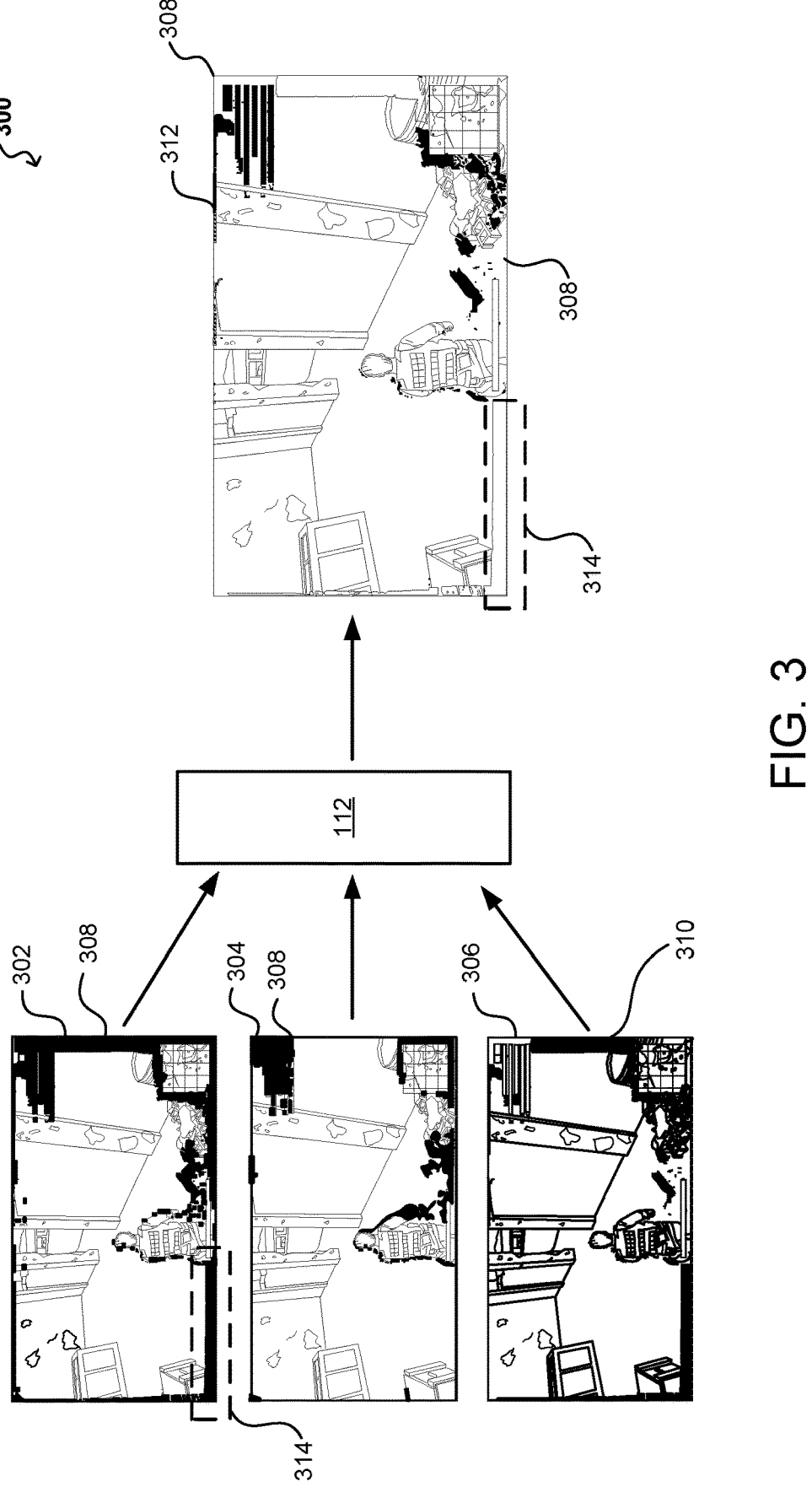
FIG. 3 illustrates an example of a portion of an occlusion filling pipeline for occlusion due to movement out of a frame, according to at least one embodiment.

FIG. 3 is an example representation 300 of a filling process to fill pixels that are occluded due to movement out of a frame boundary (e.g., panning, zooming, etc.). In this example, the optical flow estimator 112 receives, as an input, optical flow data corresponding to a forward optical flow 302, a backward optical flow 304, and occlusion information 306 for a first frame A. It should be appreciated that the data provided in FIG. 3 is shown as an example to illustrate the occluded regions and/or movement within different frames and, in various embodiments, the visualization is not provided as an input. Instead, the input may include data corresponding to vectors for individual pixels. That is, each pixel of each frame may have its own flow data, where the forward optical flow 302 shows optical flow between frame A and frame B (e.g., frames 202, 204), backward optical flow 304 shows optical flow between frame B and frame A, and the occlusion information 306 shows an aggregate over frame A of occluded pixels. In this example, invalid pixels 308 are highlighted in the optical flows 302, 304 with different shading. Additionally, occluded regions 310 are also segmented or otherwise mapped to illustrate particular regions of occlusion. As noted, the invalid pixels 308 may just correspond to pixels having an indeterminate value for optical flow due to movement out of the frame region.

Various embodiments of the present disclosure use the optical flow estimator 112 to estimate optical flow for one or more pixels of the frame A based, at least in part, on the input information. If it is determined that the occlusion is due to movement out of the frame, as noted above, different pixels may have their optical flow approximated by using a negative value of the backward optical flow. For example, in the output flow representation 312, which corresponds to frame A, it can be seen that regions around the boundary 314, among other regions, have been filled, even though forward optical flow 302 illustrates that those regions are unknown due to movement out of the frame. As noted, this output is provided as an example only to assist in the present discussion, and the output of the processing may include assigning vectors to different pixels. As shown, when compared to the forward optical flow 302, the output flow representation 312 has fewer invalid pixels 308. These pixels may then be filled by using one or more additional methods associated with the optical flow estimator 112—e.g., using in-painting logic.

Figure 4A:
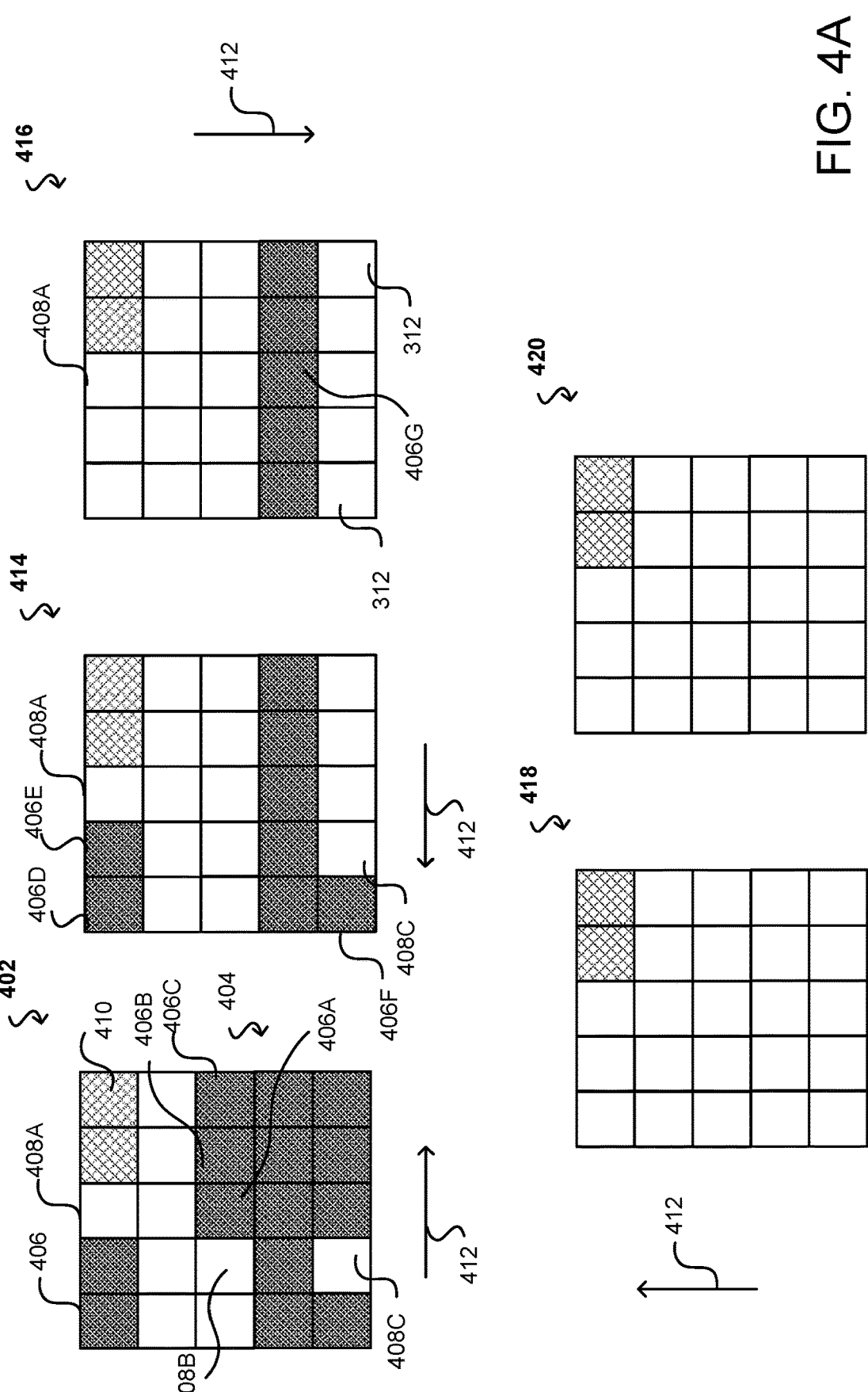
FIGS. 4A and 4B illustrate examples of a portion of an occlusion filling pipeline to account for occlusion due to object movement, according to at least one embodiment.

FIG. 4A illustrates a sequence 400 of in-painting logic associated with a frame segment 402 that includes a set of pixels 404. In this example, the pixels 404 are arranged in a 5×5 grid, but such an arrangement of the segment 402 is for illustrative purposes only and is not intended to limit the scope of the present disclosure. The pixels 404 of the frame segment 402 include occluded pixels 406, boundary pixels 408, and valid pixels 410. In this example, a boundary pixel 408 may be defined as a pixel that is adjacent to an occluded pixel. The boundary pixels 408 and valid pixels 410 may have valid flow vectors, however, the occluded pixels 406 may not. It should be appreciated that the boundary pixels 408 may also be valid pixels 410, but are labeled differently because the valid pixels 410 are not in contact on at least one side with an invalid pixel.

In various embodiments, boundary pixels 408 of unfilled occluded pixels 406 may be determined by comparing the flows of the boundary pixels 408 with a global flow. The global flow may be closely related to a background object flow. These boundary pixels 408 that are similar (e.g., similarities in magnitude and polar angle) may be starting locations to in-paint. A boundary pixel 408 may be selected, and then traversing may begin in one or more directions— e.g., left, right, up, and down. Each boundary pixel 408 that satisfies the criteria may be used until all of the holes are filled. Filling for a particular pixel may end when another boundary point is contacted or when an edge is contacted.

In the illustrated example of frame segment 402, the process may be demonstrated with boundary pixels 408A, 408B, 408C. In this example, a traversal direction 412 is from left to right, as shown by the arrow. For the boundary pixel 408A, no in-filling is performed because the valid pixels 410 are contacted. For the boundary pixel 408B, movement from left to right causes in-filling to be performed on three occluded pixels 406A-406C. Similarly, in-filling occurs when starting at the boundary pixel 408C and moving from left to right.

As part of the sequence, a partially filled frame segment 414 illustrates the appearance of the frame segment 402 after the first traversal from left to right. In this example, the traversal direction 412 is now from right to left. Starting with 408A, the occluded pixels 406D, 408E are now filled. Similarly, starting with 408C, the occluded pixel 408F is filled, leading to the partially filled frame segment 416. The process may continue using the partially filled frame segment 416, where, for example, boundary pixel 408A leads to filling occluded pixel 406G when moving from top to bottom. The results of the top to bottom traversal can be seen in partially filled frame segment 418. While each of the pixels 404 in this segment 418 are filled, the traversal process will continue in the event that a cheaper fill is located, as will be described in detail below. Finally, the filled pixel segment 420 is shown after the completion of traversals from each selected boundary pixel 408.

Figure 4B:
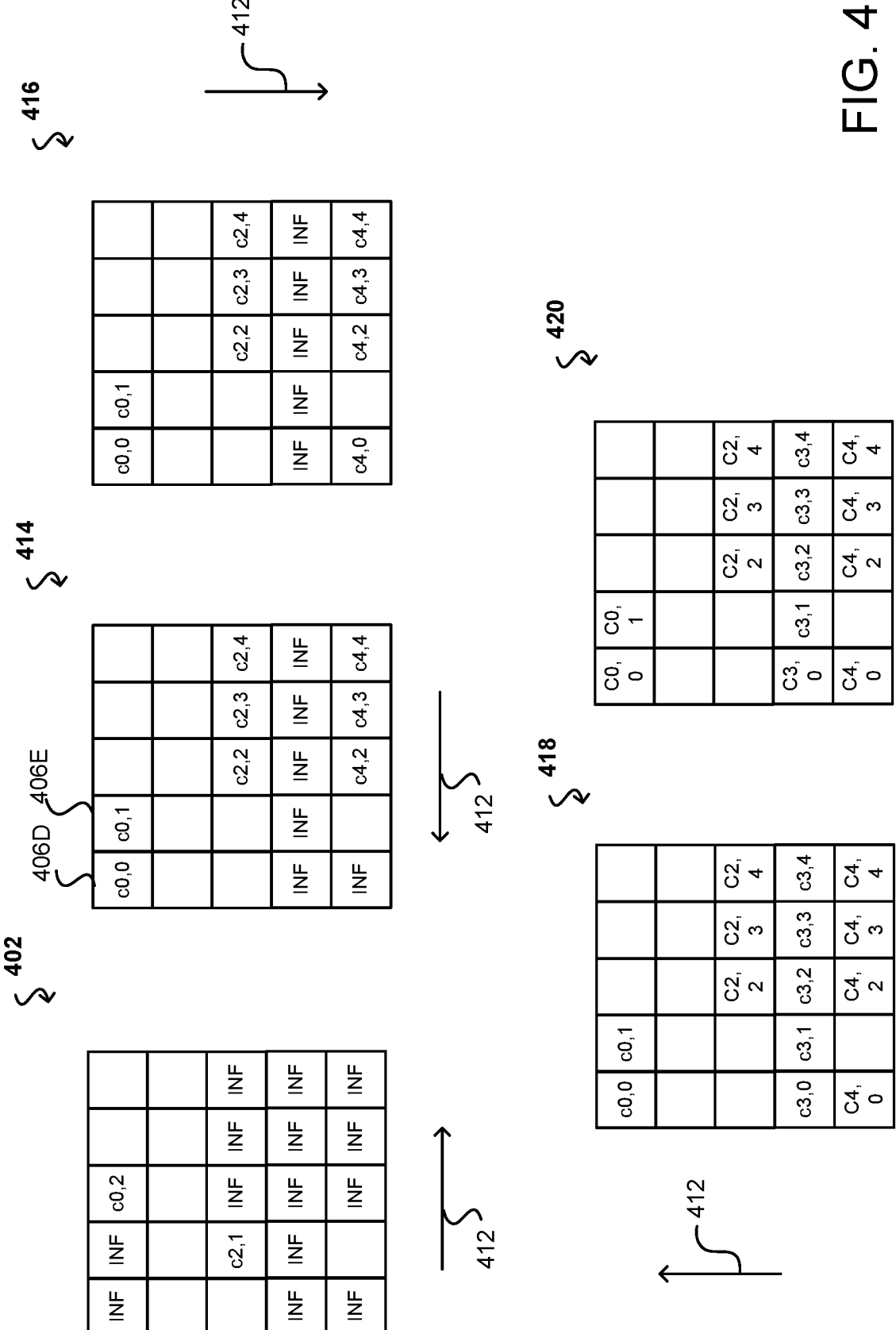

In various embodiments, this fast scanline method for filling the remaining pixels may use a costmap such that a candidate pixel is filled with a flow which minimizes its costs. As shown in FIG. 4B, the sequence 400 illustrates the costs associated with various in-filling processes. In this example, the cost for an occluded pixel 406 is infinite. Other pixels have different costs, which may be represented by their coordinate positions, such as c(a,b). As an example, the cost c(0, 1) corresponds to a pixel being in the first row (0) and the second column (1). A lower case "c" indicates a first visit to the pixel. That is, the lower case "c" represents an initial in-filling to change an occluded pixel from an occluded pixel to one with an estimated optical flow vector. However, subsequent visits may compare the cost of the assigned optical flow vector with a potential new one and attempt to minimize the cost. For example, C(a, b) may represent this minimized cost, which may be equal to Min(c(a,b), newcost). In at least one embodiment, Dijkstra's algorithm is used to minimize cost, where cost depends upon traveled distance, warp cost, and an intensity difference. The optical flow with the lowest cost may then be determined by the following:

$$infilling_{cost}=(\lambda_1*warp\_cost)+(\lambda_2*intensity\_diff)$$

which may be executed by the following pseudocode:

```
If (newcost <c(a,b))
{
    Update flow and cost
}
Else
{
    Maintain c(a,b)
}
```

In this example, the frame segment 402 includes example costs associated with in-filling using those frames, where the shading of FIG. 4A has been removed for clarity. As shown, various occluded pixels have a cost of infinity, while others have a cost corresponding to their position. In the initial frame segment 402, all costs are shown with the lower case "c" because in-filling has not yet occurred. Moreover, it should be appreciated that only certain costs are shown by clarity and conciseness.

After the first operation to generate partially filled frame segment 414, it can be seen that the occluded pixels 406D, 406E are now filled with respective costs associated with optical flow vectors, where the costs are shown with a lower case "c" due to the first visit being used to fill the pixels. Additional processes are shown in partially filled frame segments 416, 418 where costs may be replaced with capital "C" indications, illustrating that it was determined that a subsequent process was cheaper than what had previously been selected for the in-filling. For example, in the partially filled frame segment 416, certain pixels have been visited a second time during the top to bottom process, and it may be determined that certain pixels had a cheaper cost to infilling. In this manner, each pixel within a pixel region may be evaluated and a cheapest cost in-filling candidate may be selected, thereby reducing processing resources or memory use when estimating optical flow vectors for occluded pixels.

Figure 5:
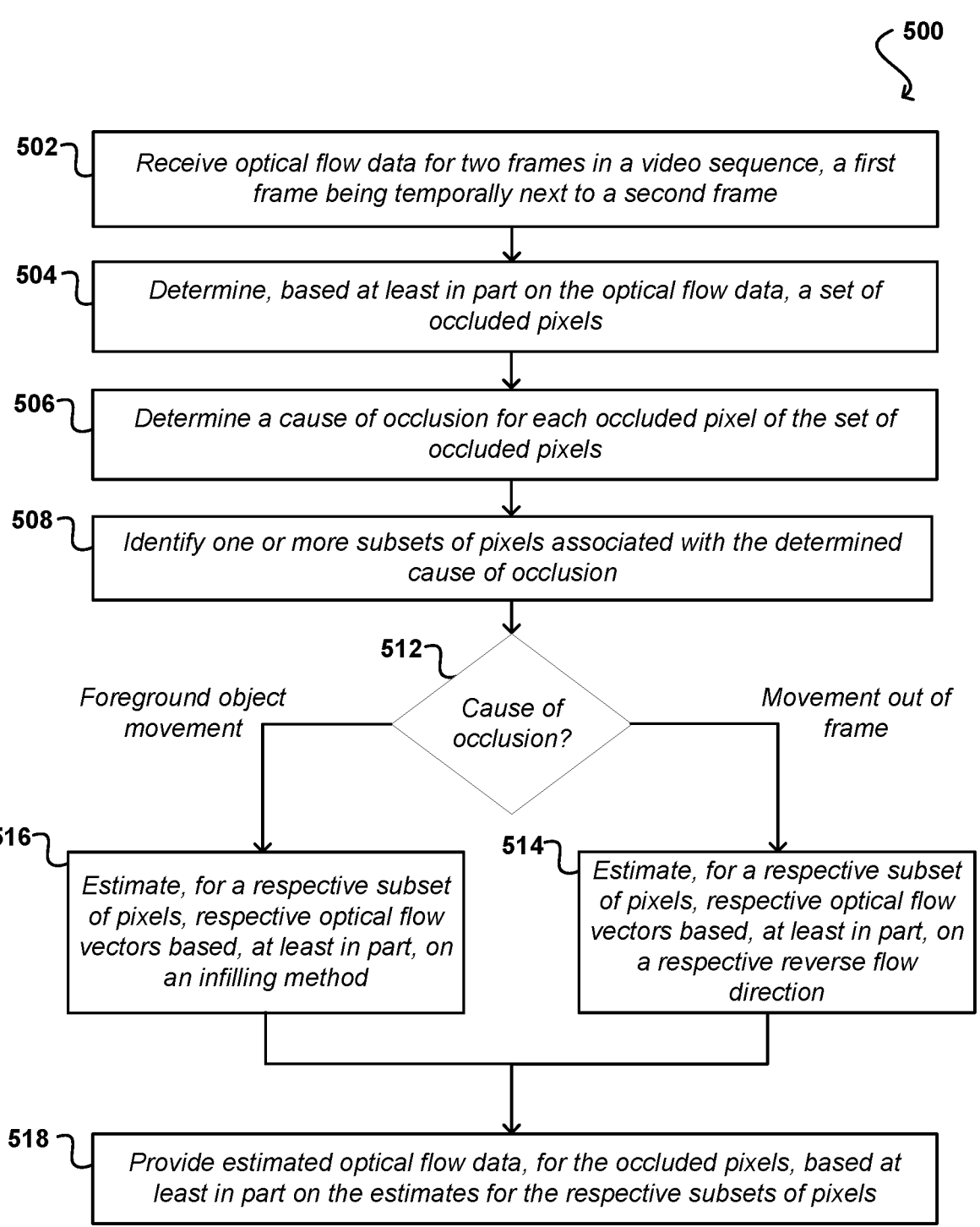
FIG. 5 illustrates an example flow chart of a process for estimating optical flow vectors for occluded pixels, according to at least one embodiment.

FIG. 5 illustrates an example process 500 for determining optical flow for occluded pixels. It should be understood that for this and other processes presented herein that there can be additional, fewer, or alternative operations performed in similar or alternative order, or at least partially in parallel, within the scope of various embodiments unless otherwise specifically stated. In this example, optical flow data is received for at least two frames in a video sequence 502. The frames are temporally next to one another, but it should be appreciated that the frames are not necessarily sequential frames within the video sequence. That is, there may be intermediate frames between the two frames being analyzed. The optical flow data may be used to determine a set of occluded pixels 504. For example, a portion of the optical flow data may include forward flow vectors and a portion of the optical flow data may include backward flow vectors. These vectors may then be compared between the two frames to determine the set of occluded pixels.

In at least one embodiment, a cause of occlusion may be determined for the occluded pixels of the set of occluded pixels 506. There may be a variety of causes for the occlusion, and as a result, different techniques may be used to estimate optical flow vectors based, at least in part, on the different causes of occlusion. As an example, one cause of occlusion may be due to movement of a pixel out of a frame boundary, for example due to panning or zooming. Another cause may be due to a pixel being hidden due to foreground object motion. Yet another cause may be noise. It should be appreciated that various techniques may be used to identify the cause of occlusion. For example, with respect to movement outside of a frame boundary, a pixel may be evaluated to determine whether its optical flow carried it out of frame. For occlusion due to foreground object movement, one or more segmentation and/or object identification algorithms may be used to identify an object between the two frames to determine whether an object boundary has moved into a frame.

Various embodiments may also include identifying one or more subsets of pixels associated with the determined cause of occlusion 508. For example, different subsets of pixels may be grouped or otherwise tagged for processing using one or more techniques of the present disclosure. As a result, different pixels may be grouped for specific processing. It should be appreciated that this grouping or tagging may include preparing pixels for processing using one or more techniques. Identification of the cause of occlusion 512 may be used to determine how to process the pixels to estimate a valid flow vector. For example, if the cause of occlusion is movement out of the frame, optical flow vectors may be estimated for those pixels based, at least in part, on respective reverse flow directions 514. That is, at a given location, the reverse (e.g., negative value) of the flow vector that carries the pixel out of the frame may be applied. If the cause of occlusion is due to foreground object movement, optical flow vectors may be estimated based on an in-filling method 516. As a result, different techniques—which have different costs and therefore may allow for faster, less processor-intensive estimations—may be applied based on the cause of occlusion. Accordingly, estimated optical flow data may be provided for use by one or more processing pipelines 518.

FIG. 6A illustrates an example process 600 for determining optical flow for occluded pixels where occlusion is caused by movement of a pixel out of a frame boundary between a first frame and a second frame. In this example, optical flow data is received for two or more temporally spaced frames of a video sequence 602. As noted, the images may not be directly next to one another, but at least one image will be at a time to and at least one image will be at a time $t_1$, where $t_0$ and $t_1$ are different from one another. Based on the optical flow data, a set of occluded pixels may be determined 604. For example, part of the optical flow data may include information corresponding to forward flow. Additionally, part of the optical flow data may include information corresponding to backward flow. Comparing the two may provide occlusion information that identifies a set of pixels that are occluded between the first image and the second image. For example, if zooming in occurs between the first image and the second image, certain pixels from the first image will no longer be within the frame boundary of the second image.

In at least one embodiment, it is determined that the occlusion of the set of occluded pixels is due to movement out of the boundary frame, for example, due to panning or zooming. For each of these pixels, a reverse direction flow vector may be determined 606. For example, if an initial flow vector that carries the pixel out of the frame is a forward flow vector, then the reverse is a backward flow vector. Similarly, if the initial flow vector that carries the pixel out of frame is a backward flow vector, then the reverse flow vector is a forward flow vector. The optical flow vectors for the respective occluded pixels may then be estimated as a negative value of the respective reverse direction flow vectors 608. In this manner, sets of pixels may be quickly evaluated and assigned estimated flow vectors. This process may be completed with reduced consumption of memory or processing resources when prepared to traditional techniques. Accordingly, processing may be faster such that the techniques may be performed in real or near-real time (e.g., without significant delay), thereby providing a greater set of applications for use, including but not limited to, video game rendering, video processing, object identification and tracking, navigation, and the like.

Figure 6B:
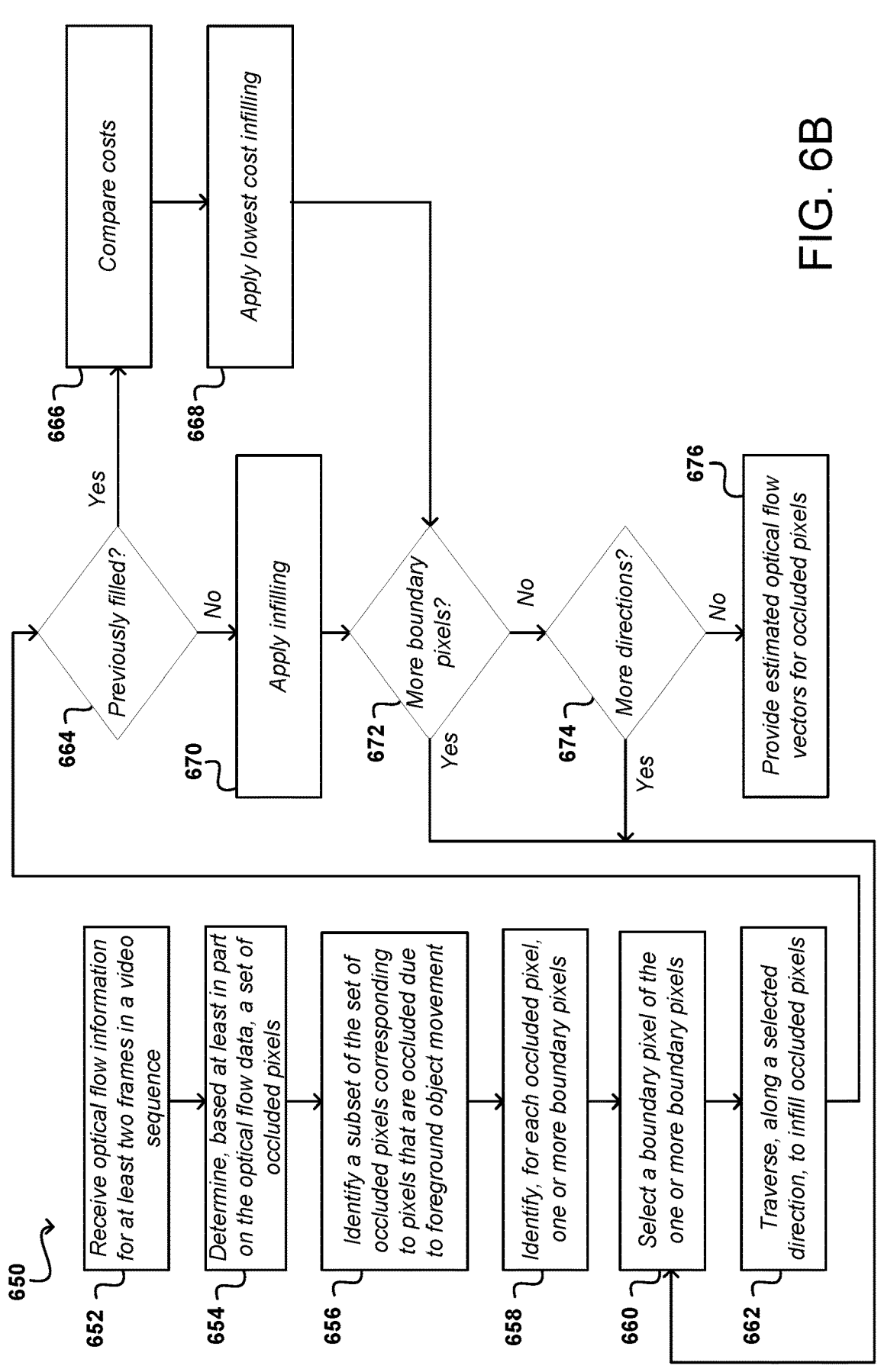
FIG. 6B illustrates an example flow chart of a process for estimating optical flow vectors for occluded pixels due to object movement, according to at least one embodiment.

FIG. 6B illustrates an example process 650 for determining optical flow for occluded pixels where occlusion is caused by foreground object movement between a first frame and a second frame. In this example, optical flow information for at least two frames in a video sequence is received 652. As noted, the two frames may not be directly temporally next to one another, but the at least two frames are at different temporal positions within the video sequence. The optical flow data may be used to determine a set of occluded pixels 654. For example, forward flow vectors and backward flow vectors may be compared to identify regions of occluded pixels between a first frame and a second frame. From the set of occluded pixels, a subset corresponding to pixels that are occluded due to foreground object movement may be identified 656. For example, in various embodiments, occlusion may be due to different factors, such as movement out of a frame boundary, noise, etc. These different factors may lead to different types of optical flow estimations, and as a result, identification of the subset may be useful in selecting a particular algorithm or technique for analysis.

A boundary pixel may be identified for each occluded pixel 658. Boundary pixels may correspond to a pixel that contacts, along at least one edge, an occluded pixel. As a result, a boundary pixel may be a boundary pixel for a number of different occluded pixels. A boundary pixel may then be selected 660 and traversal may begin along a selected direction to in-fill occluded pixels with estimated flow vectors 662. For example, a fast scanline may be used when traversal occurs in a number of directions, such as left, right, up, and down. The traversal may begin in a direction from a pixel, identify an occluded pixel, apply in-filling, and then continue until another boundary pixel or an edge is contacted. During the traversal, it may be determined whether the occluded pixel has already been in-filled 664. If so, a cost for each of the in-fillings may be compared 666 and the lowest cost may be selected for the occluded pixel 668. If not, then the in-filling for the selected boundary pixel may be applied 670.

Once the boundary pixel has traversed along the selected direction and the appropriate occluded pixels have been filled, it is determined whether there are additional boundary pixels for traversal 672. If so, a different pixel may be selected and then traversal, evaluations, and in-filling continues. If not, then it may be determined whether there are additional directions of traversal 674. If so, then a boundary pixel may be selected for traversal along a different direction. If not, then it may be determined that the occluded pixels have all been filled, and therefore, estimated optical flow vectors for the occluded pixels may be provided 676, for example for use with one or more supportive applications, as noted above.

Data Center

Figure 7:
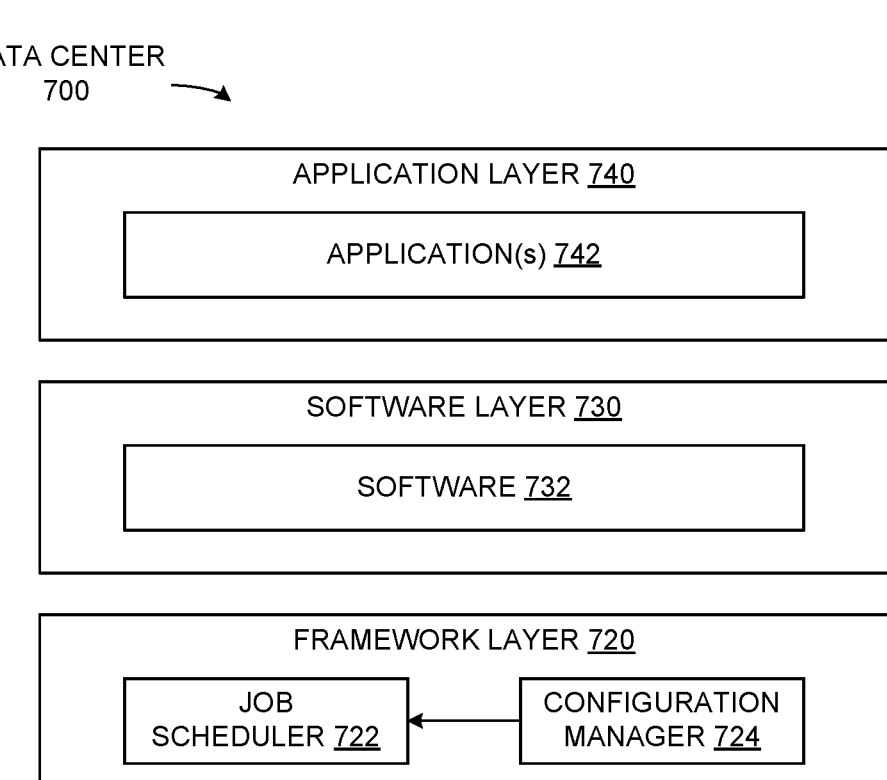
FIG. 7 illustrates an example data center system, according to at least one embodiment.
Figure 7:
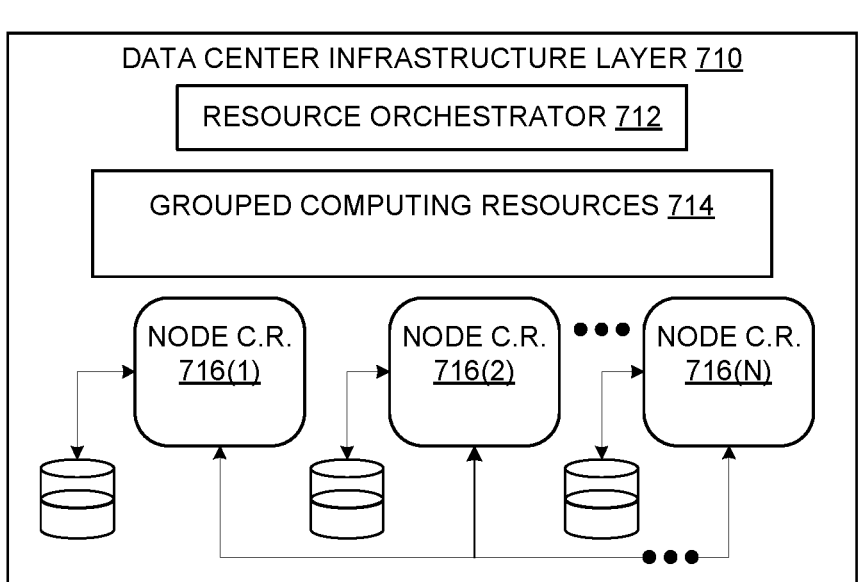

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may use distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underused and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for establishing secure connections.

Computer Systems

Figure 8:
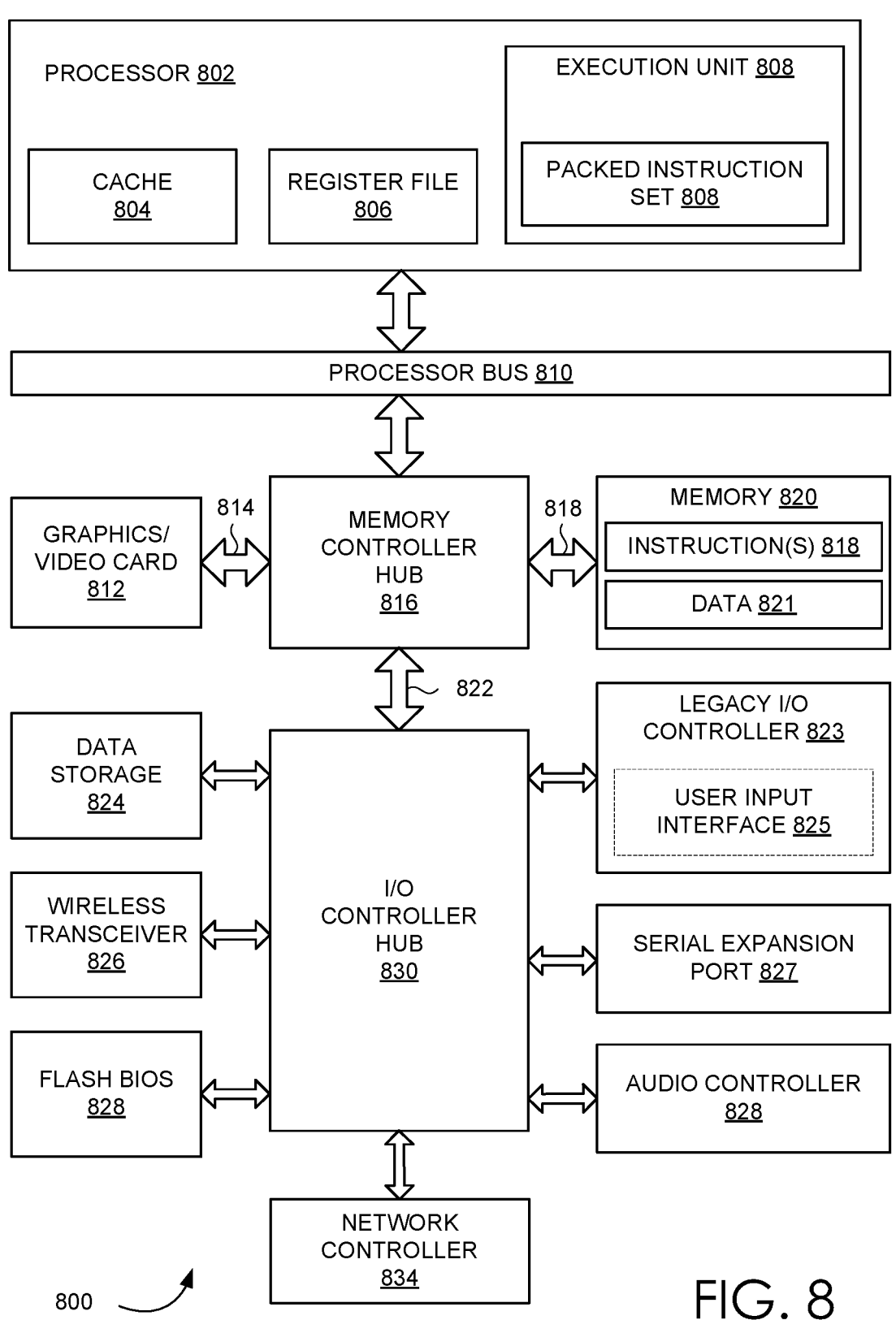
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for establishing secure connections.

Figure 9:
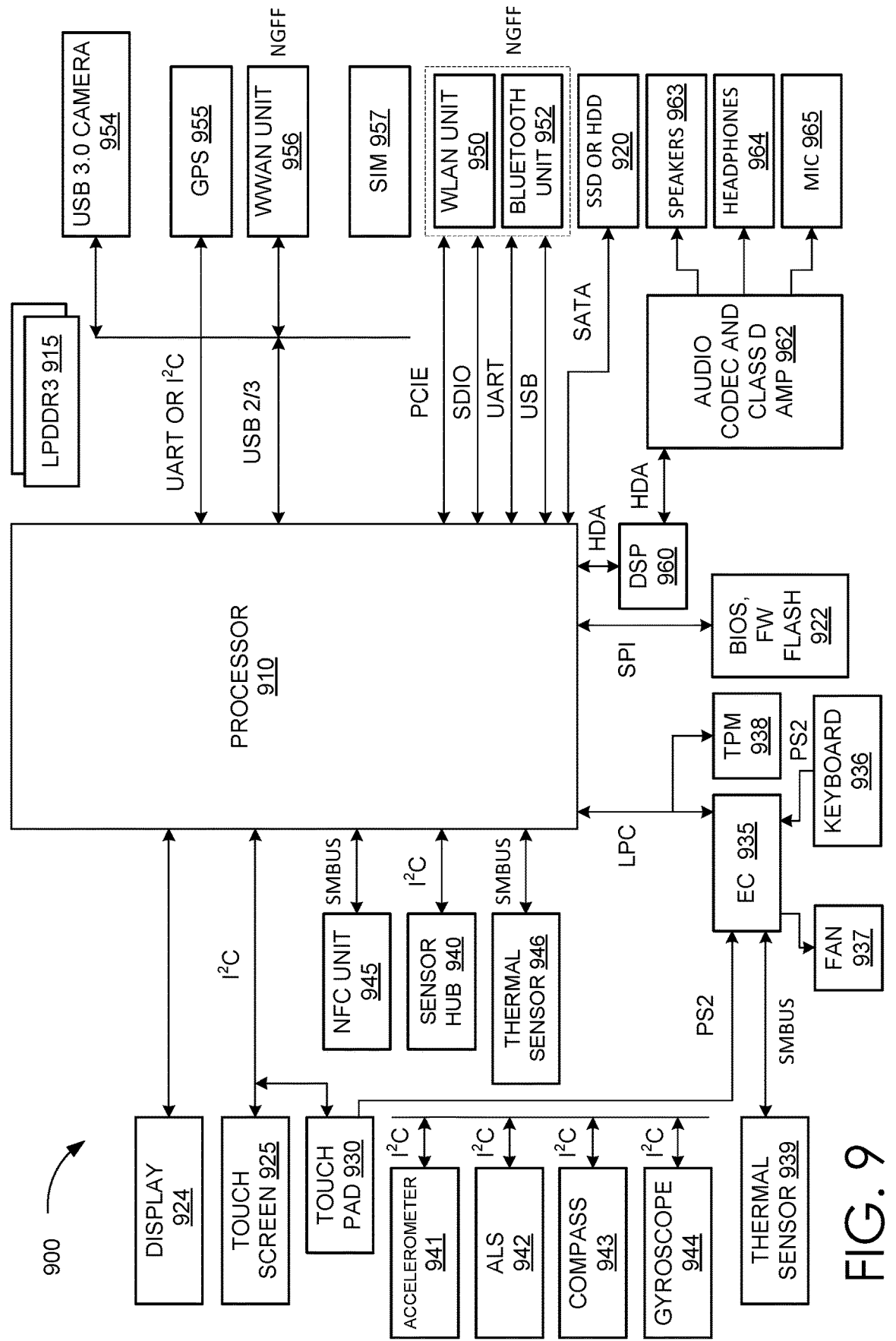
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB3.0 camera") 954 such as a USB3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for establishing secure connections.

Figure 10:
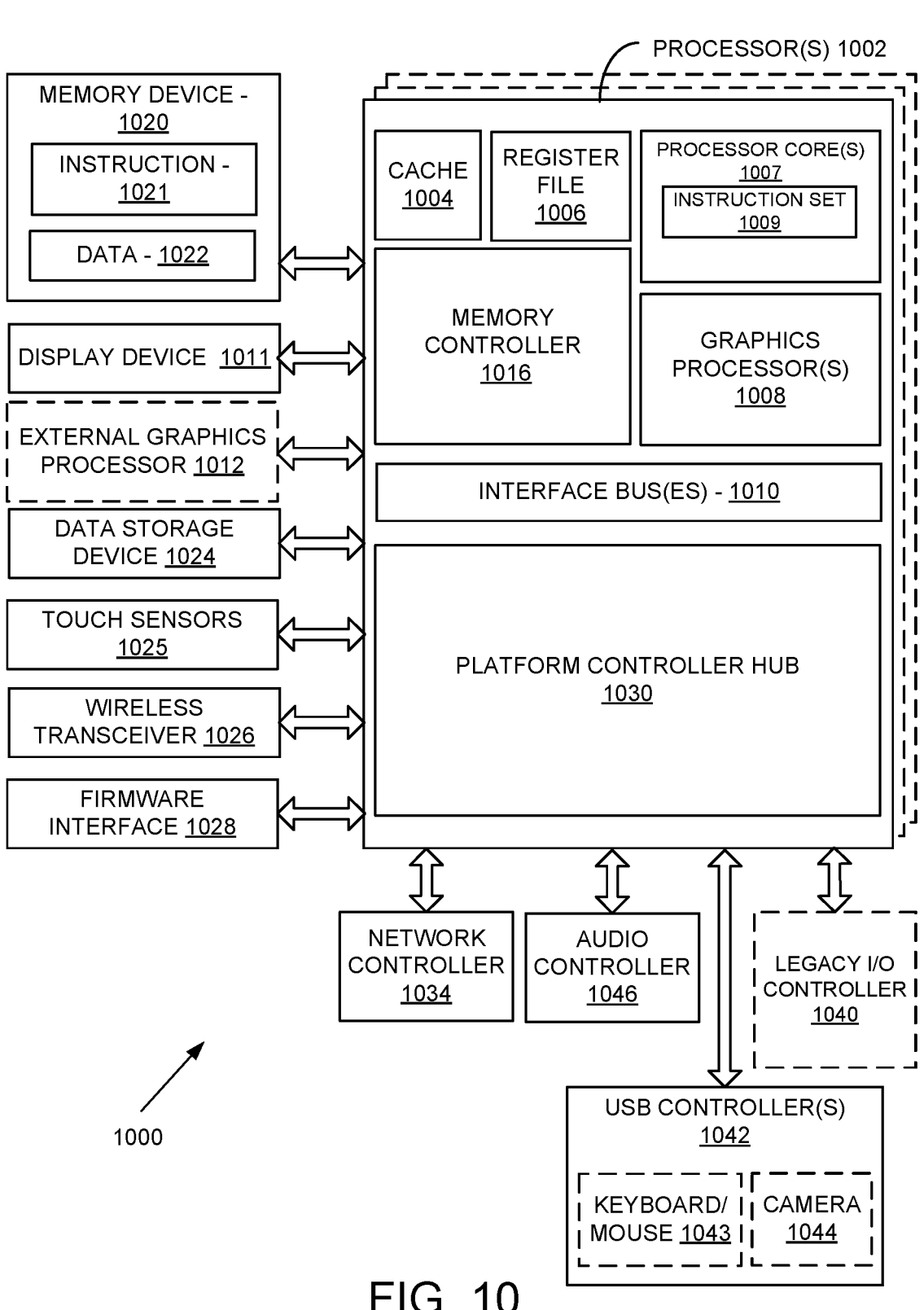
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for establishing secure connections.

Figure 11:
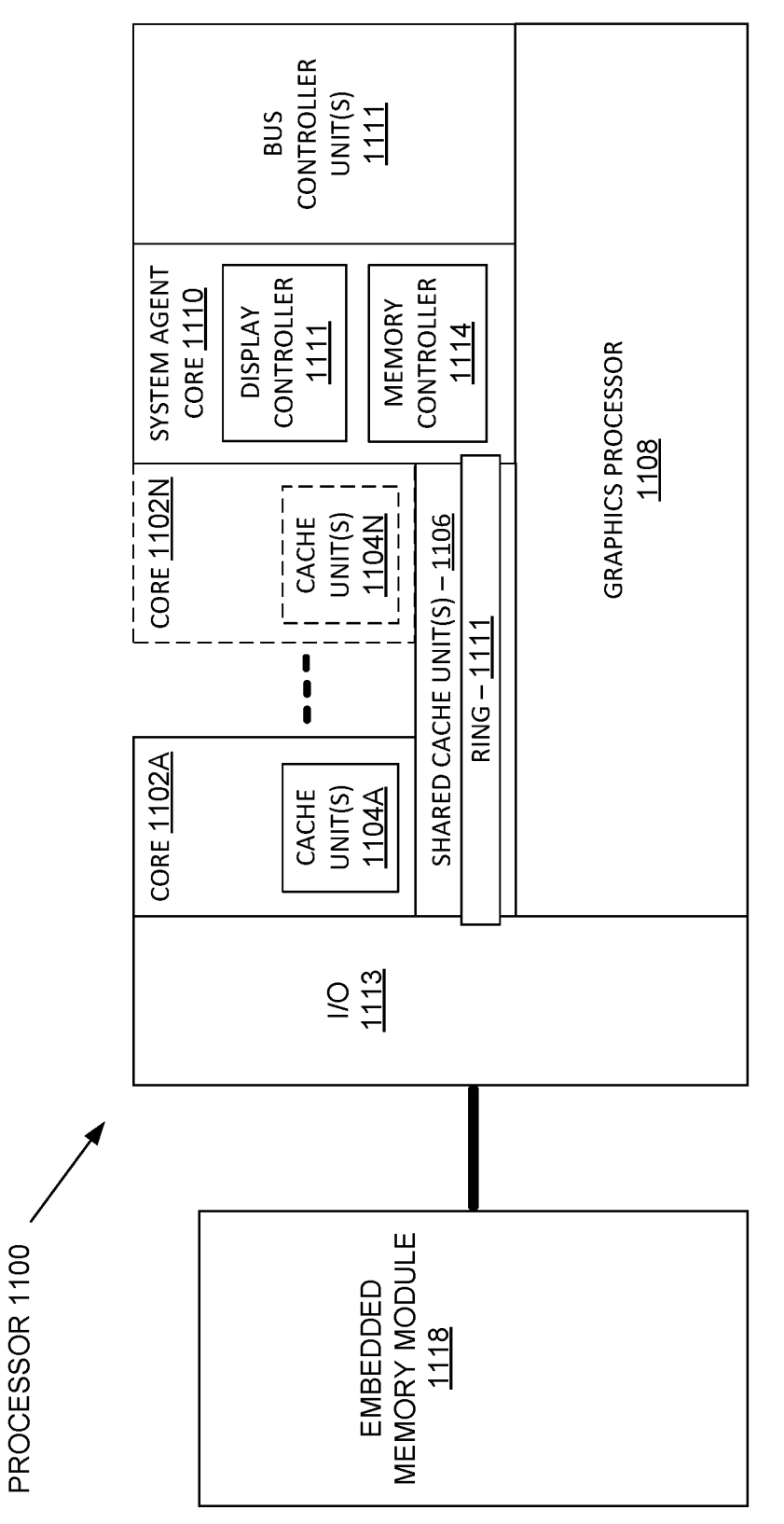
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for establishing secure connections.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
determining a set of occluded pixels, at least one individual occluded pixel of the set of occluded pixels having a respective valid flow vector in a first frame of a video sequence and a respective invalid flow vector in a second frame of the video sequence;
determining that an object depicted using at least a first pixel of the set of occluded pixels has moved out of a frame boundary between the first frame and the second frame based at least on motion data corresponding to at least the first pixel indicating a direction that is outside of the frame boundary;
estimating, for at least the first pixel, a first estimated motion vector corresponding to a reversal of a backward-directed flow vector corresponding to at least the first pixel;
determining at least a second pixel of the set of occluded pixels is occluded due to foreground object motion; and
estimating, for at least the second pixel, a second estimated motion vector corresponding to motion data of one or more boundary pixels.

2. The method of claim 1, wherein the first estimated motion vector and the second estimated motion vector are used, at least in part, to generate an intermediate frame between the first frame and the second frame.

3. The method of claim 1, further comprising tracking at least one object using, at least in part, the first estimated motion vector and the second estimated motion vector.

4. The method of claim 1, further comprising:
determining, for at least the second pixel, the one or more boundary pixels, wherein the estimating the second estimated motion vector includes executing a fast scanline technique using the motion data of the one or more boundary pixels.

5. The method of claim 4, further comprising:
determining the at least the second pixel is filled with a first motion vector;
comparing a cost between the first motion vector and a second motion vector;
determining that the second motion vector has a lower cost; and
replacing the first motion vector with the second motion vector,
wherein the second estimated motion vector is the second motion vector.

6. The method of claim 5, wherein the cost is based at least in part on at least one of a traveled distance, a warp cost, or an intensity difference.

7. A system, comprising:
one or more processing units to:
determine a set of occluded pixels, at least one individual occluded pixel of the set of occluded pixels having a respective valid flow vector in a first frame of a video sequence and a respective invalid flow vector in a second frame of the video sequence;
determine that an object depicted using at least a first pixel of the set of occluded pixels has moved out of a frame boundary between the first frame and the second frame based at least on motion data corresponding to the first pixel indicating a direction that is outside of the frame boundary;
estimate, for at least the first pixel, a first estimated motion vector corresponding to a reversal of a backward-directed flow vector corresponding to at least the first pixel;
determine at least a second pixel of the set of occluded pixels is occluded due to foreground object motion; and
estimate, for at least the second pixel, a second estimated motion vector corresponding to motion data of one or more boundary pixels.

8. The system of claim 7, wherein the first estimated motion vector and the second estimated motion vector are used, at least in part, to generate an intermediate frame between the first frame and the second frame.

9. The system of claim 7, wherein the one or more processing units are further to:
track at least one object using, at least in part, the first estimated motion vector and the second estimated motion vector.

10. The system of claim 7, wherein the one or more processing units are further to:
determine, for at least the second pixel, the one or more boundary pixels,
wherein the estimating the second estimated motion vector includes executing a fast scanline technique using the motion data of the one or more boundary pixels.

11. The system of claim 10, wherein the one or more processing units are further to:
determine the at least the second pixel is filled with a first motion vector;
compare a cost between the first motion vector and a second motion vector;

determine that the second motion vector has a lower cost; and
replace the first motion vector with the second motion vector,
wherein the second estimated motion vector is the second motion vector.

12. The system of claim 11, wherein the cost is based at least in part on at least one of a traveled distance, a warp cost, or an intensity difference.

13. The system of claim 7, wherein the system is comprised in at least one of:
a human-machine interface system of an autonomous or semi-autonomous machine;
a system for performing conversational AI operations;
a system for performing simulation operations;
a system for performing digital twin operations;
a system for performing deep learning operations;
a system implemented using an edge device;
a system implemented using a robot;
a system incorporating one or more virtual machines (VMs);
a system implemented at least partially in a data center; or
a system implemented at least partially using cloud computing resources.

14. A processor comprising:
one or more processing units to estimate a first estimated motion vector for at least a first pixel of a set of occluded pixels, the first estimated motion vector corresponding to a reversal of a backward-directed flow vector corresponding to at least the first pixel, and a second estimated motion for vector for at least a second pixel of the set of occluded pixels, the second estimated motion vector corresponding to motion data of one or more boundary pixels, based at least on determining at least one individual occluded pixel of the set of occluded pixels having a respective valid flow vector in a first frame of a video sequence and a respective invalid flow vector in a second frame of the video sequence, determining that an object depicted using at least a first pixel of the set of occluded pixels has moved out of a frame boundary between the first frame and the second frame based at least on the first pixel indicates a direction that is outside of the frame boundary, and determining the second pixel of the set of occluded pixels is occluded due to foreground object motion.

15. The processor of claim 14, wherein the first estimated motion vector and the second estimated motion vector are used, at least in part, to generate an intermediate frame between the first frame and the second frame.

16. The processor of claim 14, wherein the one or more processing units are further to:
track at least one object using, at least in part, the first estimated motion vector and the second estimated motion vector.

17. The processor of claim 14, wherein the one or more processing units are further to:
determine, for at least the second pixel, the one or more boundary pixels,
wherein the estimating the second estimated motion vector includes executing a fast scanline technique using the motion data of the one or more boundary pixels.

* * * * *